Figure 1:
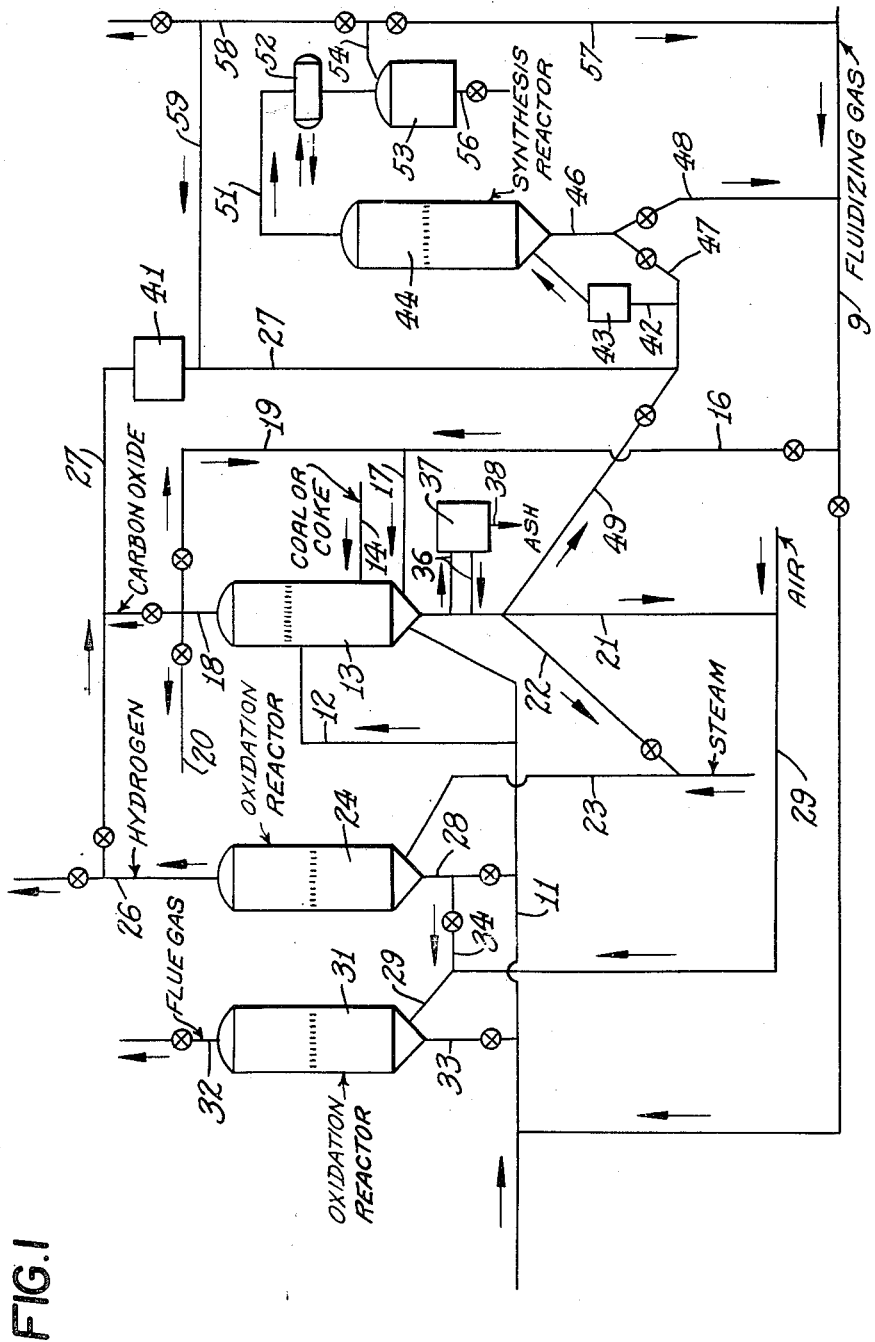

July 8, 1952

N. L. DICKINSON 2,602,809

TREATMENT OF SOLID CARBON CONTAINING MATERIALS
TO PRODUCE CARBON MONOXIDE FOR THE
SYNTHESIS OF ORGANIC MATERIALS

Filed July 10, 1948

3 Sheets-Sheet 1

INVENTOR.
NORMAN L. DICKINSON

BY E. F. Liebrecht
Cruzan Alexander
ATTORNEYS

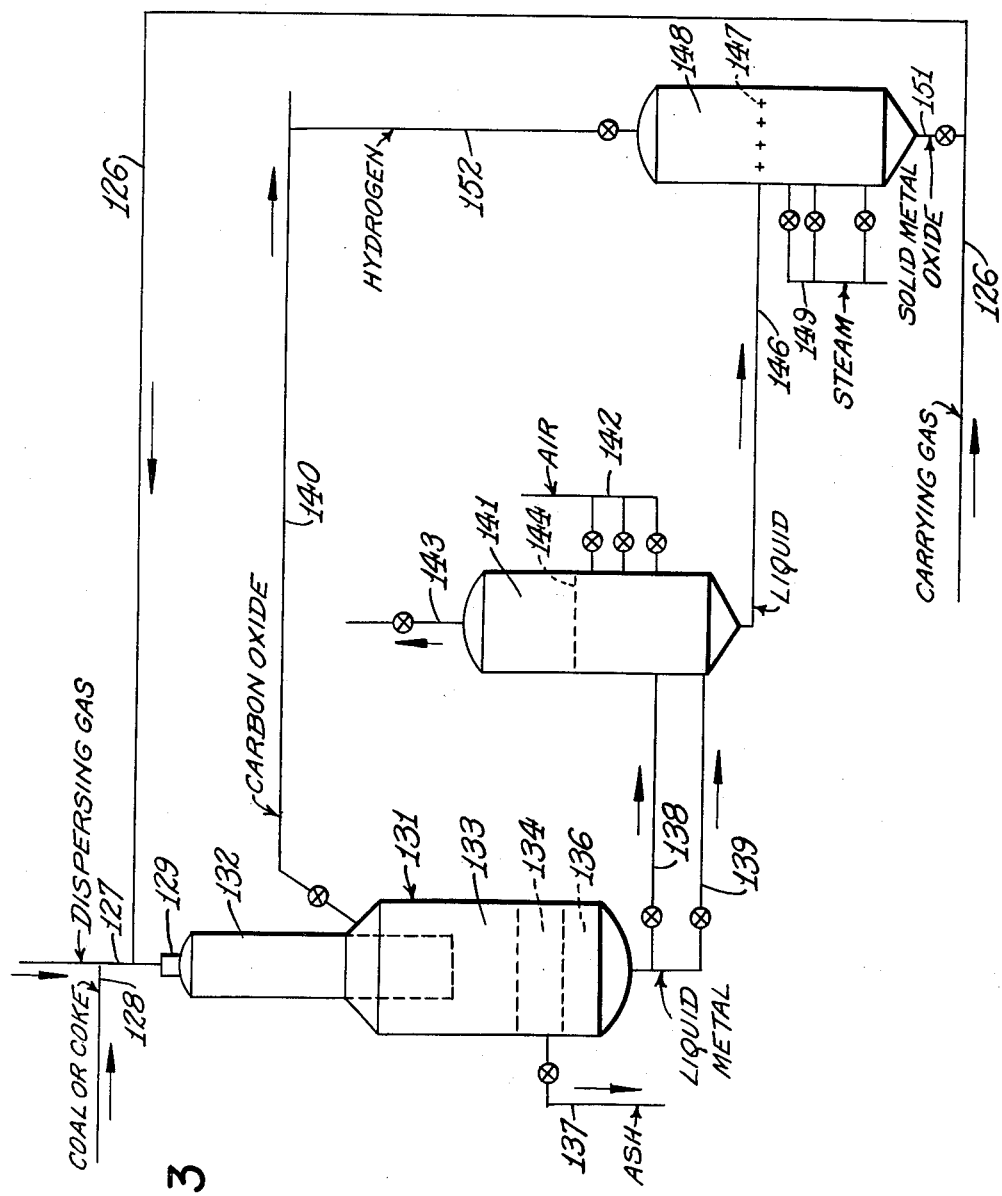

Patented July 8, 1952

2,602,809

UNITED STATES PATENT OFFICE 2,602,809

TREATMENT OF SOLID CARBON CONTAINING MATERIALS TO PRODUCE CARBON MONOXIDE FOR THE SYNTHESIS OF ORGANIC MATERIALS

Norman L. Dickinson, Basking Ridge, N. J., assignor to The M. W. Kellogg Company, Jersey City, N. J., a corporation of Delaware Application July 10, 1948, Serial No. 38,134

18 Claims. (Cl. 260—449)

This invention relates to the treatment of carbon-containing materials. In one aspect this invention relates to the treatment of solid carbon-containing materials, such as coal and coke, to produce oxides of carbon therefrom. In still another aspect this invention relates to an integrated process for the production of organic compounds having more than one carbon atom per molecule from solid carbon-containing materials.

Coal and coke may be treated with oxygen and/or steam at relatively high temperatures to convert the coal or coke to hydrogen and carbon monoxide, which products are useful for various purposes including the synthesis of organic compounds therefrom. When steam is used alone to gasify coal or coke it is necessary to supply heat from an external source, which factor makes such a process using steam alone expensive and inefficient. The use of oxygen alone is also uneconomical for obvious reasons and the heat released by gasifying coal with relatively pure oxygen tends to be excessive. As the result, steam and oxygen are normally used together in such proportions that the net reaction heat is sufficient to maintain the desired temperatures for the gasification of the coal or coke. In using the combination of steam and oxygen in the above manner the oxygen may be used in a substantially pure form and by such method the process is continuous, thermally efficient, and produces a gas comprising hydrogen and carbon monoxide. Even with the combination of steam and oxygen the purification of the oxygen often prevents such processes from being economically sound. If the oxygen is to be supplied to the process as air rather than as purified oxygen, the economical advantages obtained by using air is obviated by the fact the product gas contains large amounts of diluent nitrogen. It is desirable, therefore, to provide a process which eliminates purification of the oxygen but produces a gas substantially free from nitrogen.

The object of this invention is to provide a process for gasifying solid carbon-containing materials.

It is another object of this invention to convert coal or coke to carbon oxides.

Still another object of this invention is to provide a process for the production of a synthesis gas comprising hydrogen and a carbon oxide in the desired ratio.

Another object is to produce hydrogen and carbon monoxide separately.

Still another object of this invention is to provide a process for the reduction of metal oxides.

It is a further object of this invention to provide an integrated process for the gasification of coal and the conversion of the products thereof to organic compounds.

Yet a further object of this invention is to provide a process for the gasification of low-grade carbon-containing solid materials which are ordinarily unsuitable for other types of gasification processes because of their low ash fusion temperature and/or high ash content.

A further object of this invention is to provide an economical process for gasifying fines of coal and coke, such as "coke breeze," which cannot be processed economically in present processes by virtue of their small particle size.

Various other objects and advantages will become apparent to those skilled in the art from the accompanying description and disclosure.

According to this invention solid carbon-containing materials are oxidized to convert them to carbon oxides by indirect oxidation with air in a manner such that the nitrogen of the air does not contaminate the product gas. The gasification of the carbon-containing materials is accomplished by the alternate oxidation and reduction of a fluidized metal oxide. According to this invention, solid fuels are converted to gases by contacting a metal oxide with finely-divided solid carbon-containing materials under conditions such that the metal oxide is reduced and the carbon of the solid fuel is oxidized to carbon oxides, the metal oxide being the principal source of oxygen for the oxidation of carbon. After the reduction of the metal oxide, the reduced metal oxide is reoxidized and the cycle repeated. The metal oxide may be reduced during gasification of the coal or coke to the elementary metal or to a lower oxide, as desired. As used herein, reduced metal oxide refers to either elementary metal or a lower metal oxide resulting from the reduction of the metal oxide.

According to the preferred embodiment of the present invention, gasification of the solid carbon-containing material, such as coal or coke, and the reduction of the metal oxide are effected in a reaction zone containing a mass of fluidized metal oxide, such as magnetite ($Fe_3O_4$) or hematite ($Fe_2O_3$), maintained at an appropriate temperature of gasification into which finely-divided coal or coke is introduced. The metal oxide and solid carbon-containing material are maintained in a fluidized condition with a gasiform fluid substantially free from free oxygen. A gaseous effluent rich in carbon oxide is withdrawn from the reaction zone; at the preferred operating conditions the carbon oxide is carbon monoxide. Upon reduction of metal oxide to the extent desired or economical, reduced metal oxide is withdrawn and contacted with an oxidizing gas, such as air or steam, under conditions such that the reduced metal oxide is reoxidized. Reoxidized metal oxide is returned to the gasification zone.

When it is desired to produce hydrogen in order to blend with the carbon oxide, such as carbon monoxide, to produce a gas suitable for the synthesis of organic compounds, a portion of the reduced metal oxide in a fluidized condition is contacted with steam at an elevated temperature under conditions such that the reduced metal oxide is reoxidized and hydrogen is produced. The hydrogen thus produced may be blended with the carbon monoxide produced in the gasification or reduction step or may be used separately. The gasification of coal with a metal oxide is endothermic. The reaction of the reduced metal oxide may be endothermic or exothermic, depending on the particular oxide and the degree of oxidation, but this reaction is never sufficiently exothermic to supply heat for the gasification reaction. In order to supply heat to the gasification and when necessary to the steam-oxidation reaction, another portion of the reduced metal oxide is contacted with air to reoxidize the reduced metal oxide and liberate heat. A portion of the heat thus liberated is stored as sensible heat in the metal oxide particles and is transferred to the other reactions by the reintroduction of the reoxidized metal therein. However, application of external heat by indirect or direct means, such as by a furnace or by preheating gases or solid materials, may be practiced without departing from the scope of this invention.

The upward linear velocities of the gases used to fluidize the finely-divided particles may be adjusted in conjunction with vertical flow so that particles of ash, which in general will be of lower density than those of the metal oxides, will be entrained and withdrawn with the gaseous effluent from the upper portion of the reaction zones, after which ash is separated from the gaseous effluent by conventional means such as cyclone separators, scrubbers, etc. In this manner of operation coal and metal oxides are retained in the reaction zone as a dense pseudo-liquid mass. In the event that all of the ash cannot be separated in this manner, depending upon the operating conditions used and the character of the carbon-containing material and metal oxide, it may be necessary to remove a portion of the solids from the gasification zone and subject this portion of solids thus removed to mechanical separation methods, such as magnetic separation, elutriation, floatation, etc. After removal of the ash, this portion of the withdrawn solids is returned to the system.

It is believed that the invention may be best described by reference to the accompanying drawings which show a process for the gasification of coal in accordance with this invention.

Fig. 1 is a diagrammatic illustration in elevation of an arrangement of apparatus for the gasification of coal or coke to produce a gas comprising hydrogen and carbon monoxide and the subsequent use of the hydrogen and carbon monoxide thus produced as feed gas for the synthesis of organic compounds.

Figure 2:
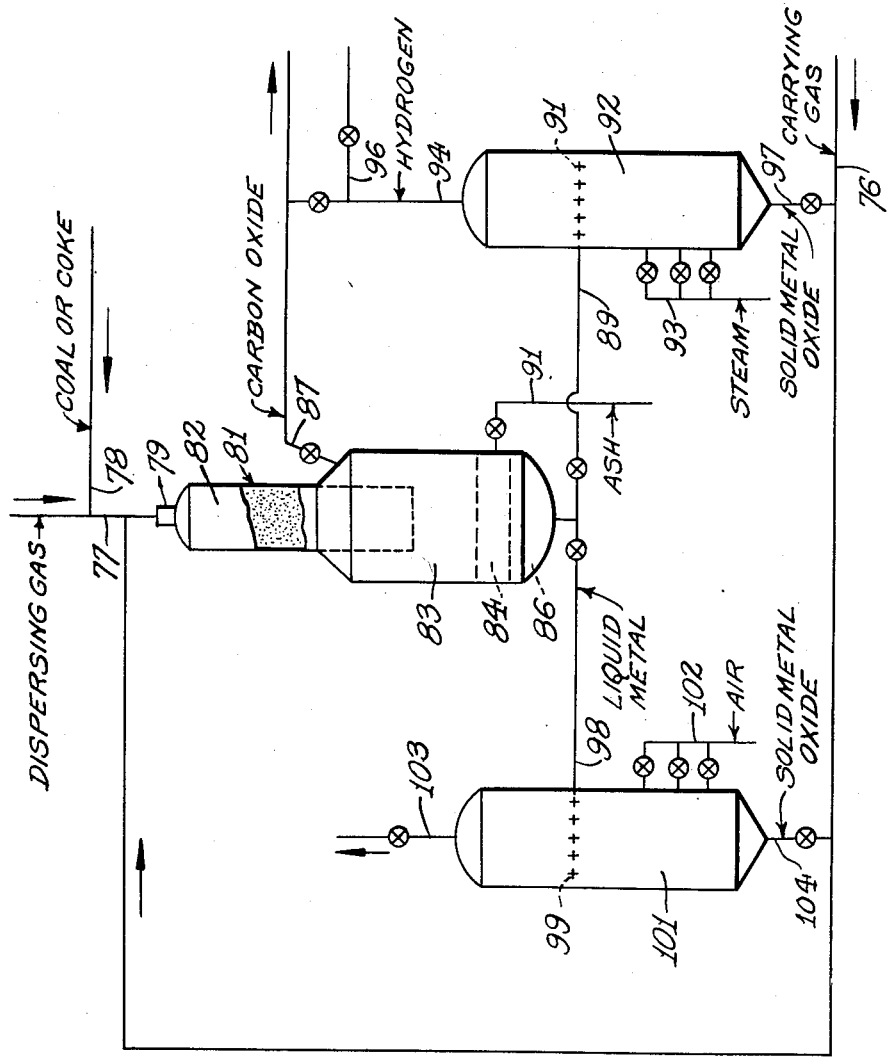

Fig. 2 of the drawing is a diagrammatic illustration in elevation, partly in cross-section, of an arrangement of apparatus for the gasification of coal and the production of hydrogen in which the coal is gasified under conditions such the ash and reduced metal oxide are molten, hereafter referred to as slagging conditions.

Fig. 3 is also a diagrammatic illustration in elevation, partly in cross-section, of a modification of the apparatus of Fig. 2 for the gasification of coal and the production of hydrogen under slagging conditions.

The principal pieces of apparatus of Fig. 1 of the drawings comprise a coal gasification zone 13, in which coal is contacted with a reducible metal oxide under conditions such that carbon oxides, primarily carbon monoxide, are produced, an oxidation zone 24 in which reduced metal oxide is contacted with steam under conditions such that reduced metal oxide is reoxidized and hydrogen is produced, a second oxidation zone 31 in which a portion of the reduced metal oxide from gasification zone 13 is oxidized with air at a relatively high temperature as a means for supplying heat to gasification zone 13, and a synthesis reaction zone 44 in which the carbon monoxide produced in reactor 13 and hydrogen produced in reactor 24 are converted to organic compounds and water.

According to Fig. 1, a fluidizing or carrying gas, such as steam, methane, recycle gas from the gasification zone 13 or synthesis zone 44, or carbon dioxide, is passed through conduits 9 and 11 or conduits 9, 16 and 17 to gasification reaction zone 13. Solid fuel, such as coal or coke and/or additional fluidizing gas is introduced into the system through conduit 11 as shown. Gases passing through conduit 11 pick up reoxidized metal oxide, such as magnetite ($Fe_3O_4$) or hematite ($Fe_2O_3$), from standpipes or conduits 28 and 33. The mixture of finely-divided metal oxide is introduced into the lower portion of gasification reaction zone 13 through conduit 11. A portion of the mixture may be introduced into the upper portion of the reaction zone 13 through conduit 12, if desired, in order to aid in the dispersion and admixing of the solids in that portion of the reaction zone.

In gasification reaction zone 13 the finely-divided metal oxide is maintained in a fluidized condition, preferably in the form of a pseudo-liquid dense phase characterized by an interface between a lower dense phase and an upper dilute phase. This pseudo-liquid dense phase is maintained in reaction zone 13 by controlling the amount of gases introduced into the bottom of reactor 13 and the linear velocity of the gases passing upward through reactor 13, this velocity being between about 0.5 and about 5 feet per second. Coal or coke is introduced into the lower portion of the dense phase in reactor 13 through conduit 14 by means of a standpipe or Fuller-Kinyon pump. Additionally or alternatively to that introduced into conduit 11, the coal or coke may be introduced at a plurality of points longitudinally or transversely of reactor 13 without departing from the scope of this invention.

It is preferred to introduce coal into the lower portion of the dense phase and the reducible metal oxides into the upper portion of the dense phase in order to minimize classification. By varying the gas velocities and shape of reactor 13, coal may be made to flow upward and the metal oxides downward in reactor 13, causing countercurrent contact between coal and metal oxides. The coal or coke is crushed or ground to a relatively fine particle size prior to introduction into reactor 13. Preferably, the powdered coal (and metal oxides) contains no more than a minor proportion of weight of material whose average particle diameter is greater than about 250 microns. The pulverization of the coal may be effected by various conventional means, such as by grinding in a ball mill, or by explosion pulverization.

Only a portion of the gas needed to fluidize the finely-divided contact mass in reactor 13 may be needed to transfer the metal oxides from standpipes 28 and 33 in reactor 13. In such a case, it may be desirable to pass only a portion of the gases from conduit 9 to conduit 11; the remainder which is not needed to carry the metal oxides to reactor 13 may be passed directly to reactor 13 through conduits 16 and 17 and injected therein through a suitable dispersion means, not shown, so as to maintain the fluidized mass under vigorous agitation.

The temperature of reactor 13 is maintained between about 1000 and about 2000° F., a preferred range with iron and its oxides being between about 1300 and about 1650° F.; such conditions are suitable for the oxidation of the coal by the metal oxides. In this respect it should be noted at such temperature conditions the metal oxides have a partial pressure of oxygen sufficient to oxidize the coal when the coal is dispersed throughout the mass of finely-divided metal oxide. The gases passing upward through the contact zone are not primarily for the purpose of oxidizing the coal but merely to maintain the finely-divided metal oxide and the finely-divided coal in a fluidized condition characterized by vigorous agitation and circulation of the contact particles. Reaction pressures range between about atmospheric and about 650 pounds per square inch gage. Preferably, however, a pressure above 100 pounds per square inch gage is employed. The ratio of carbon introduced into reactor 13 with respect to the metal oxide is, in the case of iron oxide, between about 0.05 to about 20 pounds of carbon per hour per pounds of metal oxide calculated as the elementary metal in the reactor, depending on such factors as residence time of reactants and temperature. With iron, the metal oxide introduced into reactor 13 is based on the coal fed thereto and is between about 4:1 and about 40:1 (pounds of metal oxide calculated as elementary metal per pound of coal fed).

Metal oxide is continuously reduced in reactor 13 and must be withdrawn either continuously or intermittently and reoxidized. The average residence time of the metal oxide in reactor 13 is maintained between about 5 seconds and about 30 minutes, depending upon the metal oxide used, the operating conditions, etc. The reduced metal oxide is withdrawn from the dense phase of reactor 13 for reoxidation by means of conduit or standpipe 21. The solids withdrawn from reactor 13 through conduit 21, for example, may comprise about 90 per cent by weight of the metal oxide or the elementary metal, about 9 per cent ash and about 1 per cent coal or coke. The solids withdrawn from reactor 13 through conduit 21 are divided into two streams, one solids stream is passed through the conduit 22 to conduit 23 through which superheated steam is passing at a sufficiently high velocity to carry the solids into oxidation reactor 24. Gases are passed upward through reactor 24 at a sufficient linear velocity to suspend the reduced metal oxide in the preferred embodiment of this invention in a pseudo-liquid dense phase condition as described with respect to reactor 13. Operating conditions are maintained in reactor 24 such that the reduced metal oxides, either the elementary metal or a lower oxide than that introduced into reactor 13, is reoxidized to a higher oxide and hydrogen is produced. Hydrogen, together with unconverted steam which is less than about 30 per cent at 1500° F., is removed from reactor 24 through conduit 26. Reoxidized metal oxide is withdrawn from reactor 24 through conduit 11 or standpipe 28 and returned to reactor 13 through conduits 11 or 12.

The temperature maintained in reactor 24 is usually about the same as that maintained in reactor 13, but may vary as much as 150° F. above or below that temperature, and a pressure substantially the same as that prevailing in reactor 13 is employed. With iron or iron oxide, the ratio of steam to solids calculated as the elementary metal is between about 0.4:1 and about 1.5:1 calculated as pounds of steam per pound of metal.

Another portion of the material withdrawn from reactor 13 through conduit 21 is passed to conduit 29 where it is picked up by compressed air and transferred to another oxidation reactor 31. This portion of the solids removed from reactor 13 is adjusted such that by exothermic oxidation thereof in reactor 31 a heat balance is maintained over the system of reactors 13, 24 and 31. As in reactors 13 and 24, in the preferred embodiment of this invention the finely-divided solids in reactor 31 are maintained in a pseudo-liquid dense phase condition by adjusting the upward linear gas velocity therein. The reduced metal oxides in the dense phase of reactor 31 are oxidized to higher oxides and the temperature is permitted to rise by virtue of the exothermic heat of reaction at least 50 to about 500° F. higher than the temperature of reactor 13. Flue gas consisting essentially of nitrogen is removed from reactor 31 through conduit 32 and vented to the atmosphere. A portion of the flue gas may be recycled, by means not shown, to aid in the fluidization of the solids in reactor 31, if desired. The flue gas is relatively high in temperature and this heat may be recovered by passing the gas through a waste heat boiler (not shown) or by indirect heat exchange with the gases in conduit 11 or other process streams without departing from the scope of this invention. The pressure in reactor 31 is substantially the same as in reactors 13 and 24. Reoxidized metal at a relatively high temperature is removed from 31 through conduit or standpipe 33 and returned to reactor 13 through conduits 11 and 12 as previously discussed. The heat of these solids preheats the gases in conduits 11 and 12 and maintains the temperature of reactor 13 at the desired level. Solids passed from reactor 13 to reactor 24 maintain the temperature therein at the desired level. If desired, a portion of the solids may be passed directly from reactor 31 to reactor 24 to assist in maintaining the temperature level of reactor 24.

A portion or all of the material removed from reactor 24 through conduit or standpipe 28 in another modification may be passed directly to oxidation zone 31 through conduit 34, in order to pick up heat liberated therein and/or to further oxidize the metal oxides. If all the material from reactor 24 is passed to reactor 31, it may be unnecessary to pass reduced metal oxide from reactor 13 to reactor 31. This modification minimizes the temperature required in reactor 31.

In order to minimize contamination of the effluent of reactor 13 with nitrogen which are occluded in the solids removed from reactor 31, a stripping gas, such as steam, is introduced into standpipe 33 to strip nitrogen from the solids therein. The solids passing through conduit 21 may be stripped with a suitable gas, such as steam or carbon dioxide, to minimize the occlusion of carbon monoxide by the solids.

In order to prevent the build-up of ash in the system, a portion of the solids in conduit 21 may be passed therefrom to an ash removal means 37 by transfer lines 36. Ash removal means 37 may comprise any suitable apparatus and equipment for removal of ash from the reduced metal oxides, such as conventional settling chambers, magnetic separators, elutriation means, etc. Ash is removed from unit 37 through conduit 38 and the reduced metal oxides are returned to conduit or standpipe 21 through transfer means 36.

The effluent from unit 13 containing carbon oxides is withdrawn therefrom from conduit 18 and may be recycled through conduits 19 and 17 for further conversion thereof and as an aid in maintaining the finely-divided solids in the fluidized condition in unit 13. A cyclone separator or a filter may be positioned within or external of reactor 13 to remove finely-divided entrained solids from the effluent removed through conduit 18. A portion of the effluent containing carbon oxides may be removed from the system through conduit 20 for separate use or other purposes. For example, when this effluent contains an appreciable amount of carbon dioxide, it may be passed through another reaction zone containing finely-divided coke or coal in a fluidized condition at an elevated temperature to convert a portion of the carbon dioxide to carbon monoxide. The carbon monoxide thus produced may be utilized in the manner described hereinafter. At a reaction temperature of 1500° F. in reactor 13, the mol ratio of carbon monoxide to carbon dioxide is about 2:1, and at higher temperatures an increase in carbon monoxide is obtained.

Carbon monoxide and hydrogen are passed through conduits 18 and 26, respectively, to conduit 27 in which they are combined in the appropriate proportions to provide a synthesis feed gas of the desired composition, usually a mol ratio of hydrogen to carbon monoxide of about 1:1 to about 3:1. Since these gases are at a higher temperature than is necessary for the synthesis reaction, and since in some cases, especially when there are no cyclone separators or filters used to separate solids from the effluent gases, they may contain entrained solids, such as ash, the gases are passed to a scrubber 41 in which they are contacted with a liquid scrubbing medium, such as water or oil. The scrubbing medium cools the effluent to the desired temperature and removes entrained solids and condensed steam from the gases. The gases are cooled to a temperature of about 150° F. in the scrubber 41. Cooled synthesis gas, comprising hydrogen and carbon monoxide, is passed through conduit 42 and cooler 43 to synthesis reactor 44.

In a modification of this invention, only the effluent stream in conduit 26 is scrubbed and cooled to remove water and entrained solids. Solids are removed from the effluent in conduit 18 by means of a cyclone separator or a filter. In this manner, the heat of the effluent in conduit 18 is retained and the effluents then combined and passed to synthesis reactor 44.

Scrubber 41 may be operated at elevated pressures, when using water as the scrubbing medium, under conditions to remove at least a portion of the carbon dioxide from the effluent, if desired.

In synthesis reactor 44, the synthesis gas passes upward through a mass of finely-divided contact material maintained therein in a pseudo-liquid dense phase condition under appropriate conditions of temperature and pressure, such that organic compounds having more than one carbon atom per molecule are produced. The contact material may comprise any suitable hydrogenation catalyst, such as iron, nickel, or cobalt. When using a contact material comprising iron, a temperature between about 450 and about 750° F. is employed, and when using a contact material comprising cobalt or nickel a temperature below about 450° F. is employed. The pressure of reaction may be between about atmospheric and about 500 pounds per square inch gage, preferably at a pressure slightly lower than the pressure of reactor 13. According to one embodiment of this invention, the contact material in synthesis reactor 44 may be the same as the material used in gasification reactor 13. Under such circumstances, the reduced metal oxides from reactor 13 are passed therefrom through conduits 21 and 49 to the feed inlet line 42 of synthesis reactor 44. Contact material is withdrawn from the dense phase of synthesis reactor 44 through standpipe 46 and may be recycled through conduits 47 and 42 and cooler 43 in order to maintain the temperature at the desired level in reactor 44. Other conventional methods for cooling reaction chamber 44 may be employed without departing from the scope of this invention. Since the contact material used in synthesis reactor 44 may become deactivated as the result of the accumulation of carbonaceous deposits thereon, such as waxes and relatively high-boiling organic compounds, and as the result of oxidation, this material may be withdrawn from reactor 44 and passed to gasification reactor 13 through conduits 46, 48, 9, 16 and 17, as shown, or to oxidation reactors 24 and 31 by means not shown. In gasification chamber 13 the oxidized contact material is reduced and at least a portion of the carbonaceous deposits are removed therefrom because of the relatively high temperature maintained therein. In this particular modification, gasification chamber 13 comprises in part a regeneration chamber for the contact material removed from synthesis reactor 44. When the deactivated catalyst from reactor 44 is passed to oxidation chambers 24 and 31, the waxes, etc. are removed by oxidation.

A reaction effluent comprising organic compounds, including oxygenated compounds and hydrocarbons, is removed from synthesis reactor 44 through conduit 51 and is passed through condenser 52 to an accumulator 53. Condenser 52 may comprise a single or series of cooling and condensing units. The effluent is cooled in condenser 52 to a temperature below about 100° F. at the pressure prevailing in the synthesis reactor 44. Water and organic compounds which have been liquefied are collected in accumulator 53 and may be withdrawn therefrom through conduit 56 for further treatment and separation in a manner known to those skilled in the art.

Uncondensed vapors, including hydrogen, carbon dioxide, unreacted carbon monoxide and some relatively low-boiling hydrocarbons, are removed from accumulator 53 through conduit 54 and may be recycled to conduit 9 through conduit 57 as the fluidizing gas, or may be recycled to conduit 27 by means of conduits 58 and 59 to supplement the feed to synthesis reactor 44. A portion of this gaseous effluent from accumulator 53 may be vented through conduit 58 to prevent the build-up of undesirable gases in the system, such as nitrogen, and/or passed to a carbon dioxide absorption system (not shown) for removal of carbon dioxide from the gases. The carbon dioxide thus recovered may be recycled to conduit 9, or conduit 11, or conduit 27, as desired.

In the preferred method of operation of the various reaction units, the finely-divided contact material is maintained in a pseudo-liquid dense phase condition. However, these units may be operated by varying such factors as the shape of the reactor and the linear gas velocities, such that the contact material is entrained in the gases flowing therethrough. Velocities above about 5 feet per second are employed for such operations. In this latter type of operation, means must be provided externally of the reactor for separating contact material from the effluent and for circulating the thus-separated contact material to the same or other reaction zones in the process. In this respect, reaction unit 13 may be operated with a linear gas velocity such that ash is entrained in the gases and passes overhead while the contact material, such as iron oxide, is substantially all retained in the reactor as a pseudo-liquid dense phase. The entrained ash is then removed from the gaseous effluent in scrubbing unit 41.

The solid oxygen transfer agent or contact material of the present invention is a finely divided powder comprising a metal oxide, reducible under the conditions of operation. Various oxides may be used for transferring oxygen to the coal gasification reactor 13. Such contact material comprises oxides of iron, cobalt, nickel, molybdenum, manganese, barium, vanadium, chromium, copper, and mixtures thereof. Copper oxides are particularly desirable when used in admixture with other metals or metal oxides, such as iron oxide.

Since the heat is supplied to gasification unit 13 from oxidation reactors 24 and 31 by transfer of finely divided contact material therebetween it is desirable and particularly convenient to incorporate with the oxygen-carrying contact material a relatively inert or non-reactive finely divided heat-carrying material, such as alumina, silica, magnesia, bauxite, bentonite, sand, ash, etc. These heat-carrying materials may be present as separate particles with the oxygen-carrying material, or may be used as supports in the conventional manner with such oxygen-carrying materials. These materials absorb the heat released in oxidation reactor 31 as sensible heat and transfers that heat to reactor 24 and gasification unit 13, where it is utilized. When a heat carrier material is employed in conjunction with a separate oxygen carrier, the amount of heat-carrying material will be substantially greater than the amount of active oxygen-carrying material. As much as 5 to 40 times as much by weight of heat-carrying material as oxygen-carrying material may be used.

The use of a large quantity of inert heat-carrying material in the contact material renders the process particularly suitable for the use of cheap natural ores which contain originally a large proportion of inactive material. A naturally occurring montmorillonite type clay, such as Ittawamba clay, is particularly suitable for this purpose. Ittawamba clay contains about 5 weight per cent $Fe_2O_3$ and about 1.3 weight per cent $TiO_2$. A montmorillonite type clay may also be used as a support for oxygen-carrying material, since it is suitable as a heat carrier and has particularly desirable flow characteristics for use in fluidized systems. As previously indicated, the oxygen-carrying material, including any diluent therein, may be passed from gasification reactor 13 to synthesis reactor 44 as catalyst material and may be recycled therefrom back to gasification unit 13. In this manner of operation the oxygen-carrying material supplies the oxygen for the gasification reaction and also serves in its reduced form as the catalytic agent for the synthesis reaction. In such a modification Alan Wood ore is suitable for use as both oxygen-carrying material and as a catalyst for the synthesis reaction. This ore contains about 1 to 2 per cent alumina, 1 per cent silica, 0.4 to 1 per cent titanium oxide, and the remainder $Fe_3O_4$.

The oxygen-carrying material may be selected from materials which have a catalytic effect upon the gasification reaction or a catalytic material may be combined or admixed with the oxygen-carrying material. Such materials which have a catalytic effect upon the gasification reaction comprise nickel, chromium, vanadium, ruthenium, etc., and their oxides. A promoting ingredient may also be incorporated with the oxygen carrier and/or catalytic material. The promoting material may have a beneficial effect on the gasification reaction, and when the oxygen carrier is also used in the synthesis reaction the promoter may have a beneficial effect on the synthesis reaction. Such promoting materials comprise difficultly reducible metal oxides as barium oxide, alumina, silica, titania, thoria, manganese oxide, and magnesia. For example, when using Alan Wood ore as the oxygen-carrying material, heat-carrying material, and catalyst, for the synthesis reaction, a suitable promoter, for example barium oxide or thoria, may be incorporated therewith by fusion or other manner known to those skilled in the art.

As previously discussed, a suitable proportion of the circulating solids may constitute a heat carrier, and for this reason it may be desirable to allow ash to build up in the system whereby circulated ash serves as a heat carrier. In this modification of the invention the ash may comprise 50 per cent or more of the solids withdrawn from reactor 13 through conduit 21. Excess oxygen carrier may also be used as the heat carrier material. Thus, only a small proportion of the oxygen carrier material actually supplies oxygen for the gasification reaction, the remainder being present primarily as a means of passing heat to and from the various reaction zones.

Although solids are passed to and from the various reaction zones by means of standpipes of sufficient length to overcome pressure drops, other means known to those skilled in the art may be employed, such as by the use of conventional solids pumps, for example a Fuller-Kinyon pump.

The modification represented in Figure 2 is particularly applicable to solid fuels having a low ash fusion temperature and a high ash content. According to Figure 2 of the drawings, a carrying or fluidizing gas such as steam, carbon dioxide, recycle gas or methane, is passed through conduit 76 to gasification chamber 81. Metal oxide acting as an oxygen carrier is introduced from conduits 97 and 104 into the gas flowing through conduit 76 and is entrained in the gaseous mixture. The velocity of the gases in conduit 76 is such that the oxygen-carrying material including any heat carrier material is passed to gasification unit 81, the construction of which is similar to the combustion chamber of a conventional slagging type boiler and is built to withstand substantial superatmospheric pressures. Coal is introduced into conduit 77 through conduit 78 and a dispersing gas is introduced into conduit 77. The dispersing gas carries the coal and oxygen carrier including heat carrier material through conduit 77 to an injecting or mixing device 79 and thence into a high velocity chamber 82 of gasification unit 81. The dispersing gas introduced through conduit 77 may be the same or a different gas than that used for carrying the solids in conduit 76. The temperature of gasification unit 81 is sufficiently high that the reduced metal oxide or carrier material, including heat-carrying material and ash, becomes molten. Temperatures above about 1700° F. are preferred for this purpose, although the exact temperature will depend upon the melting points of the solids. Oxgen from the carrier material reacts with the coal passing downwardly through high velocity chamber 82 under conditions such that carbon dioxide and carbon monoxide are produced and the reduced carrier becomes molten. The resulting mixture of molten and reduced contact material, ash, and gaseous products of the process, passes from high velocity chamber 82 into a separation chamber 83 of unit 81. In separation chamber 83, the gaseous products of the process are separated from liquefied ash and reduced contact material. Reduced contact material forms a lower liquid phase 86 in separation chamber 83 and the ash forms an upper liquid phase 84 in chamber 83. The operations of unit 81 may be such that only a portion of the solids in the contact material becomes molten, and in such manner of operation liquid phase 86 comprises a mixture or slurry of solids and molten material. A suitable flux may be admixed or combined with the contact material or coal to materially reduce the melting point of any component of the solids. Such fluxing materials may comprise, for example, limestone or borax. It is particularly desirable to use such fluxing materials to reduce the melting point of the ash in the coal. The gaseous products, such as carbon dioxide and carbon monoxide, are withdrawn from chamber 83 through an outlet conduit 87. Liquefied ash is withdrawn from chamber 83 through conduit 91 for disposal. Liquefied contact material, or a slurry of liquid and solid contact material, is removed from chamber 83 through conduits 89 and 98.

It is desirable to employ a relatively low melting oxygen carrier material in this modification. For example, a copper alloy containing at least 25 per cent tin, or at least 40 per cent zinc, and up to 5 per cent nickel may be employed as both an oxygen carrier and heat carrier, as this material becomes molten at about 1600° F. Various other eutectic or alloy compositions may be used, known to those skilled in the art.

A portion of the liquefied contact material is introduced into a hydrogen producer 92 through dispersion means 91. In hydrogen producer 92 liquid reduced metal oxides are sprayed downwardly countercurrently to an upward flowing stream of steam. Steam is introduced into the lower portion of hydrogen producer 92 at a plurality of points through conduits 93 as shown. The steam reacts under the conditions maintained therein with the reduced metal oxide or oxygen carrier to produce hydrogen and to oxidize the metal. Upon oxidation the metal forms finely divided solid particles which settle at the bottom of hydrogen producer 92 and are withdrawn therefrom by means of a conventional standpipe for reintroduction into conduit 76 as previously described. Hydrogen producer 92 is maintained at a temperature between the melting points of the reduced metal oxide stream introduced therein and the solid reoxidized metal which is withdrawn therefrom. This temperature is maintained approximately the same or as much as 150° F. above or below the temperature of gasification unit 81, but higher or lower temperatures may be employed, depending on the particular operating technique of the process. An excess amount of steam is used to completely oxidize all of the metal oxidizing agent. However, the metal is not necessarily oxidized to its higher oxide.

Another portion of the liquefied contact material is removed from chamber 83 through conduit 98 and is introduced into heater 101 through distributor 99. The molten metal is sprayed downwardly in heater 101 and the molten particles contact upwardly-flowing air introduced therein at a plurality of points through conduit 102. The metal is oxidized with the air at a relatively high temperature, usually at least 50 to 500° F. above the temperature of gasification chamber 81, but not so high as to liquefy the oxidized material. The oxidation of the molten metal to the oxides results in finely divided solid particles being formed containing the heat of reaction as sensible heat. Reoxidized oxygen-carrier in finely divided form and at a relatively high temperature is withdrawn from heater 101 through conduit 104 and is introduced into conduit 76 as previously described. Flue gas is removed from heater 101 through conduit 103. Flue gas may be recirculated through heater 101 or heat exchanged with other fluid streams of the process. The proportion of the liquefied contact material passed to hydrogen producer 92 and heater 101 is controlled such that a sufficient amount of heat is supplied to the system to maintain gasification unit 81 and hydrogen producer 92 at the desired temperature. In this respect the operation of the modification of Fig. 2 is similar to the operation of the modification of Fig. 1.

The hydrogen produced in hydrogen producer 92 is withdrawn overhead through conduit 94 and is combined with the carbon monoxide in conduit 87 in the appropriate amount so as to produce a synthesis feed gas having the desired hydrogen to carbon monoxide ratio. This feed gas may be passed to a synthesis reactor similar to that shown in the embodiment of Fig. 1. If desired, a portion of the hydrogen may be withdrawn from the system through conduit 96 for separate use and treatment.

Figure 3 of the drawings is a diagrammatic illustration in elevation of a modification of the process described with respect to Figure 2, and consequently only a brief discussion thereof will be made. In the modification of Figure 3, the oxidation reactors are in series. As in Figure 2, the modification of Figure 3 is applied exceptionally well to solid fuels having a low ash fusion temperature and/or high ash content.

A carrying or fluidizing gas, such as carbon dioxide, steam, or methane, is passed through conduit 126 to gasification reactor 131. The carrying gas picks up the finely divided oxidizing agent from conduit or standpipe 151 and the resulting mixture passes to gasification reactor 131 as previously discussed with respect to Fig. 2. A dispersing gas such as steam is introduced into gasification unit 131 through conduit 127, and coal or coke is introduced into conduit 127 through conduit 128. The mixture of oxidizing agent, coal, and dispersing gas is introduced by means of injection and mixing means 129 into the high velocity section 132 of gasification unit 131. Gasification unit 131 is similar in construction to that described with respect to Fig. 2. The coal or coke is oxidized by means of the oxidizing agent such as iron oxide to produce carbon monoxide at a temperature preferably above about 1700° F. A dispersed phase of solids passes downwardly through high velocity section 132 into separting section 133 of gasification unit 131. At the temperature of operation, the ash remaining from the oxidation of the coal or coke, and the reduced oxidizing agent, are liquefied. An upper liquefied ash phase 134 and a lower liquefied reduced oxygen carrier 136 form in the lower portion of separator 133. The liquefied or molten ash is withdrawn from separator 133 through conduit 137 for disposal. Liquefied oxidizing agent, or a mixture of a metal and its oxides, is passed from gasification unit 131 through conduits 138 and 139 to the lower portion of an oxidizing unit 141, the construction of which is similar to a Bessemer converter and built to withstand pressure. The molten mixture forms a liquid layer 144 in oxidation unit 141. Air is bubbled through the liquid oxygen-carrier by introduction at a plurality of points through conduits 142. Flue gas comprising nitrogen is removed from oxidation unit or heater 141 through conduit 143. The molten mixture of oxygen-carrier is partially oxidized at a temperature at least 50° to about 500° F. above the temperature prevailing in gasification unit 131. Under these temperature conditions and with the appropriate degree of oxidation the mixture remains fluid in oxidation unit 141 and is removed therefrom through conduit 146 and introduced into a second oxidation unit 148 by means of distribution and dispersion means 147. The fluid oxidizing agent is sprayed downwardly in oxidation unit 141 and countercurrently contacts an upward flowing stream of steam introduced at a plurality of points into reactor 148 through conduit 149. The temperature in oxidation unit 148 is about the same as the temperature of oxidation unit 141 and sufficient steam is introduced to completely oxidize the oxidizing agent to an oxide, although not necessarily the highest oxide, whereby finely divided solid particles of oxygen-carrier are collected in the lower portion of oxidation unit 148. The reoxidized solid oxygen-carrier is passed from oxidation unit 148 through a standpipe or conduit 151 to conduit 126 as previously described. The reaction of the oxidizing agent, such as the elementary metal or a lower metal oxide, with steam produces hydrogen. The hydrogen is removed from oxidation unit 148 through conduit 152 and after removal of unconverted steam by condensation (not shown) is combined with the carbon monoxide in conduit 140 in the appropriate amount to form a suitable synthesis feed gas comprising hydrogen and carbon monoxide. The synthesis feed gas is passed to the conventional synthesis equipment as illustrated in Fig. 1.

The amount of oxidation effected in unit 141 is regulated such that the heat of reaction required in unit 131 and unit 148 is supplied by the oxidation effected in unit 141, and the required amount of hydrogen is produced by the oxidation effected in unit 148. In another modification of Fig. 3 steam rather than air may be introduced into unit 141, and air rather than steam may be introduced into 148. In such a modification hydrogen is withdrawn from unit 141 through conduit 143 and is combined with the carbon monoxide in conduit 140. Flue gas comprising nitrogen is removed from oxidation unit 148 through conduit 152 and is vented to the atmosphere, used as a fluidizing gas, or recirculated, as desired.

In the modification of Figs. 2 and 3 a low melting oxidizing agent is preferably used, for example, zinc, bismuth, tin, and lead, and their oxides, or these metals may be combined with higher melting metals such as copper to form alloys or eutectics having relatively low melting points.

Specific reference may be had to my prior and copending application Serial No. 751,728, filed June 2, 1947 for general background material and methods of pulverizing and handling coal or coke.

Certain valves, coolers, heaters, pumps, accumulators, storage vessels, conduits, etc., have been omitted from the drawings as a matter of convenience and clarity, and their use and location will become apparent to those skilled in the art. It is not intended to limit any particular location of inlets and outlets of the apparatus shown in the drawings. The examples and theory in connection with the invention are offered as illustrations and should not be construed to unnecessarily limit the invention.

I claim:

1. A process for the gasification of solid carbon-containing material which comprises introducing finely-divided reducible metal oxide selected from at least one of the group consisting of the oxides of iron, cobalt, nickel, molybdenum, manganese, barium, vanadium, chromium and copper and solid carbon-containing material into a reaction zone, suspending such finely-divided reducible metal oxide and said solid carbon-containing material in a gasiform fluid substantially free from free oxygen passing through said reaction zone, maintaining said reaction zone under endothermic conditions and at a temperature such that carbon is oxidized to carbon monoxide as the principal reaction by reduction of said metal oxide, withdrawing from said reaction zone reduced metal oxide, reoxidizing by contact with free oxygen said withdrawn reduced metal oxide under exothermic conditions and at a higher temperature than maintained in said reaction zone, reintroducing the reoxidized metal oxide into said reaction zone at a temperature above the temperature level maintained therein such that heat is supplied to said reaction zone thereby, and withdrawing from said reaction zone an effluent comprising carbon monoxide as a product of process, said reducible metal oxide being the principal source of oxygen for the oxidation of carbon to carbon monoxide.

2. A process for the gasification of solid carbon-containing material which comprises introducing finely-divided reducible metal oxide selected from at least one of the group consisting of the oxides of iron, cobalt, nickel, molybdenum, manganese, barium, vanadium, chromium and copper and solid carbon-containing material into a reaction zone, passing a gasiform fluid substantially free from free oxygen upwardly in said reaction zone through a mass comprising said finely-divided reducible metal oxide and solid carbon-containing material at a velocity sufficient to maintain said mass in a pseudo-liquid fluidized condition whereby finely-divided solids are circulated throughout a dense phase of fluidized solids, maintaining said reaction zone under exothermic conditions and at a temperature such that carbon is oxidized to carbon monoxide as the principal reaction by reduction of said metal oxide, withdrawing from said reaction zone finely-divided reduced metal oxide, reoxidizing by contact with free oxygen said reduced metal oxide under exothermic conditions and at a higher temperature than maintained in said reaction zone, returning reoxidized metal oxide to said reaction zone at a temperature above the temperature level maintained therein such that heat is supplied thereto and withdrawing from said reaction zone an effluent comprising carbon monoxide as a product of the process, said reducible metal oxide being the principal source of oxygen for the oxidation of carbon to carbon monoxide.

3. The process of claim 2 in which a portion of said effluent withdrawn from said reaction zone is recycled as at least a portion of said gasiform fluid.

4. The process of claim 2 in which said finely-divided reducible metal oxide is introduced into the upper portion of said dense phase and said finely-divided solid carbon-containing material is introduced into the lower portion of said dense phase.

5. The process of claim 2 in which said reducible metal oxide comprises an iron oxide.

6. The process of claim 2 in which said reducible metal oxide comprises as initially introduced into the process an iron-containing ore.

7. The process of claim 2 in which reducible metal oxide comprises a copper oxide.

8. A process for the gasification of solid carbon-containing material which comprises continuously introducing finely-divided reducible metal oxide selected from at least one of the group consisting of the oxides of iron, cobalt, nickel, molybdenum, manganese, barium, vanadium, chromium and copper and solid carbon-containing material into the lower portion of a reaction zone, entraining said finely-divided reducible metal oxide and solid carbon-containing material in an upwardly flowing gasiform fluid substantially free from free oxygen in said reaction zone, maintaining the linear gas velocity of said gasiform fluid above about five feet per second, maintaining said reaction zone under endothermic conditions and at a temperature such that carbon is oxidized to carbon monoxide as the principal reaction by reduction of said metal oxide, withdrawing a gaseous effluent comprising carbon monoxide and entrained reduced metal oxide from said reaction zone, separating reduced metal oxide from said effluent, reoxidizing by contact with free oxygen the reduced metal oxide thus recovered under exothermic conditions and at a temperature above the temperature of said reaction zone, returning reoxidized metal oxide to said reaction zone at a temperature above the temperature level maintained therein such that heat is supplied thereto, and recovering said carbon monoxide as a product of the process, said metal oxide being the principal source of oxygen for the oxidation of carbon to carbon monoxide.

9. A process for the gasification of solid carbon-containing material which comprises injecting finely-divided reducible metal oxide and solid carbon-containing material into a first reaction zone by suspension in a gasiform fluid substantially free from free oxygen, maintaining said first reaction zone under endothermic conditions and at a temperature such that carbon is oxidized to a carbon oxide as the principal reaction by reduction of said metal oxide and such that reduced metal oxide and ash thus produced are liquefied, collecting said liquefied reduced metal oxide and ash, discarding liquefied ash, passing said liquefied reduced metal oxide to a second reaction zone in which reduced metal oxide is reoxidized under exothermic conditions and at a temperature above that maintained in said first reaction zone to form finely-divided metal oxide particles, recycling from said second reaction reoxidized metal oxide in the form of finely-divided particles to said first reaction zone at a temperature above the temperature level maintained therein to supply heat thereto, and withdrawing from said first reaction zone an effluent comprising a carbon oxide as a product of the process, said reducible metal oxide being the principal source of oxygen for the oxidation of carbon to a carbon oxide.

10. The process of claim 9 in which said reducible metal oxide comprises an alloy containing tin and copper.

11. A continuous process for producing a gas rich in hydrogen and carbon monoxide which comprises passing a gasiform fluid substantially free from free oxygen upwardly in a first reaction zone through a mass comprising finely-divided reducible metal oxide and coal at a velocity sufficient to maintain said mass in a pseudo-liquid fluidized condition, maintaining said first reaction zone at a temperature such that carbon is oxidized to carbon monoxide as the principal reaction by the reduction of said metal oxide, said reducible metal oxide being the principal source of oxygen for the oxidation of said carbon to carbon monoxide, separately withdrawing from said first reaction zone finely-divided reduced metal oxide and an effluent comprising carbon monoxide, passing a portion of said withdrawn reduced metal oxide to a second reaction zone, passing steam upwardly in said second reaction zone through a mass comprising finely-divided reduced metal oxide at a velocity sufficient to maintain said mass in a pseudo-liquid fluidized condition, maintaining said second reaction zone at a temperature such that said reduced metal oxide is reoxidized by reaction with steam to produce hydrogen as the principal reaction, the combined reactions of said first and said second reaction zones being endothermic, separately withdrawing from said second reaction zone finely-divided reoxidized metal oxide and an effluent comprising hydrogen, combining the effluent from said first reaction zone with the effluent from said second reaction zone to form a gaseous mixture comprising hydrogen and carbon monoxide as the product of the process, passing another portion of said reduced metal oxide from said first reaction zone to a third reaction zone, passing air upwardly in said third reaction zone through a mass comprising finely-divided reduced metal oxide at a velocity sufficient to maintain said mass in a pseudo-liquid fluidized condition whereby said reduced metal oxide is reoxidized at a temperature above that maintained in both of said first and said second reaction zones and heat is liberated, and withdrawing reoxidized metal oxide at a relatively high temperature from said third reaction zone and passing same to said first reaction zone at a temperature above the temperature level maintained therein as means for supplying heat of reaction thereto.

12. The process of claim 11 in which said gaseous mixture of hydrogen and carbon monoxide is passed to a fourth reaction zone in which hydrogen and carbon monoxide are converted to organic compounds including methane, removing an effluent from said fourth reaction zone comprising unreacted hydrogen, methane and higher boiling organic compounds, separating unreacted hydrogen and methane from said effluent, and passing said unreacted hydrogen and methane to said first reaction zone as at least a portion of the gasiform fluid.

13. The process of claim 12 in which reduced metal oxide is passed from said first reaction zone directly to said fourth reaction zone as a catalyst for the conversion of hydrogen and carbon monoxide to organic compounds, and withdrawing metal oxide from said fourth reaction zone and passing same to said first reaction zone.

14. A continuous process for the production of a gaseous mixture rich in hydrogen and carbon monoxide which comprises injecting finely-divided reducible metal oxide and coal into a first reaction zone with a gasiform fluid substantially free from free oxygen, maintaining said first reaction zone at a temperature such that carbon is oxidized to carbon monoxide as the principal reaction by the reduction of metal oxide and such that reduced metal oxide and ash are liquefied, said metal oxide being the principal source of oxygen for the oxidation of carbon to carbon monoxide, collecting liquefied ash and reduced metal oxide, discarding liquefied ash, passing liquefied reduced metal oxide to a second reaction zone, passing air upwardly through said liquefied metal oxide in said second reaction zone under conditions such that reduced metal oxide is reoxidized under exothermic conditions, maintaining a temperature in said second reaction zone above the temperature maintained in said first reaction zone and sufficiently high such that metal oxide is maintained in a molten condition, removing molten metal oxide from said second reaction zone and introducing same into the upper portion of a third reaction zone, passing steam upwardly in said third reaction zone countercurrently to a downflowing stream of metal oxide under conditions such that metal oxide is oxidized by reaction with steam to produce hydrogen as the principal reaction, maintaining a temperature in said third reaction zone such that all the metal oxide is solidified upon oxidation, withdrawing finely-divided metal oxide particles from said third reaction zone and passing same to said first reaction zone, and withdrawing carbon monoxide from said first reaction zone and hydrogen from said third reaction zone and combining same as the product of the process.

15. A continuous process for the production of a gaseous mixture rich in hydrogen and carbon monoxide which comprises injecting finely-divided reducible metal oxide and finely-divided coal into a first reaction zone with a gasiform fluid substantially free from free oxygen, maintaining said first reaction zone at a temperature such that carbon is oxidized to carbon monoxide as the principal reaction by the reduction of said metal oxide and such that metal oxide and ash are liquefied, said metal oxide being the principal source of oxygen for the oxidation of carbon to carbon monoxide, collecting liquefied reduced metal oxide and ash, discarding liquefied ash, passing a portion of said liquefied reduced metal oxide to the upper portion of a second reaction zone, passing steam upwardly in said second reaction zone countercurrently to a downwardly flowing stream of reduced metal oxide under conditions such that reduced metal oxide is oxidized by reaction with steam to produce hydrogen as the principal reaction, the combined reactions of said first and said second reaction zones being endothermic, maintaining a temperature in said second reaction zone such that all the reoxidized metal oxide is solidified to form finely-divided particles, removing hydrogen from said second reaction zone and combining same with carbon monoxide from said first reaction zone to form a gaseous mixture as the product of the process, passing another portion of said liquefied reduced metal oxide from said first reaction zone to the upper portion of a third reaction zone, passing air upwardly in said third reaction zone countercurrently to a downwardly flowing stream of reduced metal oxide under conditions such that reduced metal oxide is oxidized with the liberation of heat, maintaining a temperature in said third reaction zone above that temperature maintained in both of said first and said second reaction zones and such that all the reoxidized metal oxide is solidified to form finely-divided particles, and withdrawing finely-divided metal oxide from said second and third reaction zones and passing same to said first reaction zone, the temperature of said finely-divided metal oxide passed from said third reaction zone to said first reaction zone being above the temperature of said first reaction zone such that heat is supplied to said first reaction zone.

16. A process for producing a gas rich in hydrogen and carbon monoxide which comprises introducing finely-divided reducible metal oxide and solid carbon-containing material into a first reaction zone, suspending finely-divided reducible metal oxide and solid carbon-containing material in a gasiform fluid substantially free from free oxygen in said first reaction zone, maintaining said first reaction zone at a temperature such that carbon is oxidized to carbon monoxide as the principal reaction by the reduction of said metal oxide, said reducible metal oxide being the principal source of oxygen for the oxidation of said carbon to a carbon oxide, withdrawing reduced metal oxide and a gaseous effluent comprising a carbon oxide from said first reaction zone, passing reduced metal oxide from said first reaction zone to a second reaction zone, suspending reduced metal oxide in said second reaction zone in a stream of steam under conditions such that reduced metal oxide is reoxidized by reaction with steam to produce hydrogen as the principal reaction, the combined reactions of said first and said second reaction zones being endothermic, withdrawing reoxidized metal oxide from said second reaction zone and returning same to said first reaction zone, combining effluents from said first and said second reaction zones to produce a gas rich in hydrogen and carbon monoxide as a product of the process, passing reduced metal oxide from said first reaction zone to a third reaction zone, suspending reduced metal oxide in a stream of air in said third reaction zone under exothermic conditions and at a temperature above that maintained in both said first and said second reaction zones such that reduced metal oxide is oxidized, and withdrawing reoxidized metal oxide from said third reaction zone, and returning reoxidized metal oxide from said third reaction zone to said first reaction zone at a temperature above that maintained in said first reaction zone to supply heat thereto.

17. A process for producing a gas rich in hydrogen and carbon monoxide which comprises introducing finely-divided iron oxide and coal into a first reaction zone, suspending iron oxide and coal in a gasiform fluid substantially free from free oxygen such that a pseudo-liquid phase of finely-divided particles is formed in said first reaction zone, maintaining in said first reaction zone a temperature between about 1300 and about 1650° F., a pressure between about 100 and about 650 pounds per square inch gage and a ratio by weight of iron oxide fed to the first reaction zone based on coal fed to the first reaction zone of between about 4:1 and about 40:1 such that carbon is oxidized to carbon monoxide as the principal reaction by the reduction of iron oxide, said iron oxide being the principal source of oxygen for the oxidation of coal to carbon monoxide, withdrawing reduced iron oxide from said first reaction zone, passing reduced iron oxide from said first reaction zone to a second reaction zone, suspending reduced iron oxide in said second reaction zone in a stream of steam such that a psuedo-liquid phase of finely-divided particles is formed, maintaining in said second reaction zone a temperature within 150° F. of the temperature of said first reaction zone such that reduced iron oxide is reoxidized by reaction with steam to produce hydrogen as the principal reaction, the combined reactions of said first and said second reaction zones being endothermic, combining effluents from said first and said second reaction zones to produce a gas rich in hydrogen and carbon monoxide as a product of the process, withdrawing reoxidized metal from said second reaction zone and returning same to said first reaction zone, passing reduced iron oxide from said first reaction zone to a third reaction zone, suspending reduced iron oxide in said third reaction zone in a stream of air such that a pseudo-liquid phase of finely-divided particles is formed, maintaining said third reaction zone under exothermic conditions at a temperature at least 50° F. above the temperature of both said first and said second reaction zones such that reduced iron oxide is reoxidized, and returning reoxidized metal oxide from said third reaction zone to said first reaction zone at a temperature above that temperature maintained in said first reaction zone to supply heat to said first reaction zone.

18. A process for the gasification of solid carbon-containing material which comprises contacting a finely-divided reducible metal oxide selected from at least one of the group consisting of the oxides of iron, cobalt, nickel, molybdenum, manganese, barium, vanadium, chromium and copper with a finely-divided solid carbon-containing material in a reaction zone, suspending the mass of finely-divided reducible metal oxide and solid carbon-containing material in a gasiform fluid substantially free from free oxygen in said reaction zone, maintaining said reaction zone during contact between reducible metal oxide and carbon-containing material under endothermic conditions and at a temperature such that carbon is oxidized to carbon monoxide as the principal reaction by reduction of said metal oxide, thereafter reoxidizing reduced metal oxide by contact with free oxygen under exothermic conditions at a higher temperature for reuse in the reaction in which carbon is oxidized to carbon monoxide and to supply heat thereto, and recovering from said reaction zone an effluent comprising carbon monoxide as a product of the process, said reducible metal oxide being the principal source of oxygen for the oxidation of carbon to carbon monoxide.

NORMAN L. DICKINSON.

REFERENCES CITED

The following references are of record in the file of this patent:

UNITED STATES PATENTS

| Number | Name | Date |
|---|---|---|
| 1,969,264 | Grant | Aug. 7, 1934 |
| 2,400,075 | Claussan | May 14, 1946 |
| 2,449,635 | Barr | Sept. 21, 1948 |
| 2,507,502 | Corner et al. | May 16, 1950 |

FOREIGN PATENTS

| Number | Country | Date |
|---|---|---|
| 7,518 | Great Britain | July 29, 1887 |
| 8,239 | Great Britain | Mar. 10, 1900 |

OTHER REFERENCES

Hongen et al., Chemical Process Principles, part one, pages 254–255, 266–267.